United States Patent [19]

Greco et al.

[11] Patent Number: 5,116,929
[45] Date of Patent: May 26, 1992

[54] COPOLYESTER-DIOL POLYCARBONATES, PROCESS FOR PRODUCING THEM AND THEIR USE

[75] Inventors: Alberto Greco, Dresano; Patrizia Blasioli, Biassono, both of Italy

[73] Assignee: Enichem Synthesis S.p.A., Palermo, Italy

[21] Appl. No.: 420,769

[22] Filed: Oct. 10, 1989

[30] Foreign Application Priority Data

Oct. 14, 1988 [IT] Italy ............... 22295 A/88

[51] Int. Cl.$^5$ .................. C08G 18/44; C08G 18/32
[52] U.S. Cl. ......................... 528/44; 528/76; 528/80; 528/83; 528/85; 528/367; 528/370; 528/372
[58] Field of Search ............ 528/44, 76, 80, 83, 528/85, 367, 370, 372

[56] References Cited

U.S. PATENT DOCUMENTS 4,996,283 2/1991 Grieco et al. .................... 528/80

Primary Examiner—John Kight, III
Assistant Examiner—Duc Truong
Attorney, Agent, or Firm—Shea & Gould

[57] ABSTRACT

Copolyester-diol polycarbonates fluid at room temperature, having a number average molecular weight comprised within the range of from 1,500 to 6,000 with a glass transition temperature ($T_g$) lower than −45° C., useful in the sector of polyurethanes and in the sector of sealants, are obtained by means of a reaction of transesterification by starting from:
 (a) and organic carbonate,
 (b) an aliphatic diol,
 (c) an oligopolyester-diol.

This latter is the product of reaction of an aliphatic bicarboxy acid with a mixture of two or more diols, comprising neopentyl glycol.

11 Claims, No Drawings

COPOLYESTER-DIOL POLYCARBONATES, PROCESS FOR PRODUCING THEM AND THEIR USE

The present invention relates to copolyester-diol polycarbonates useful in the sector of polyurethanes and in the sector of sealants, and to the process for preparing them.

In the art, homopolymer and copolymer diol polycarbonates and copolyester-diol polycarbonates are known, which are mainly used in the sectors of thermo-elastomers, of the sealants and of the paints in combination with di-isocyanates or poly-isocyanates, in particular when good characteristics of resistance to hydrolysis are required.

In particular, homopolymer diol polycarbonates are known, which can be obtained from dialkyl carbonate or diaryl carbonate and exanediol-1,6 by means of reactions of transesterification, as disclosed in U.S. Pat. No. 3,544,524 and in French patent 7440838. Such products are solid, with a melting point of the order of 45° C., for a molecular weight of the order of 2000.

More generally, these products display such characteristics as reported by R. Schnell in "Chemistry and Physics of Polycarbonates", J. Wiley and Sons, 1964 (page 15), herein it is stated that all of the homopolymer diol carbonates deriving from aliphatic ($C_4$-$C_{12}$)-diols are crystalline solids, with a melting range of from 30° C. to 60° C., as a function of their molecular weight. The fact of being solid at room temperature, and of being easily crystallizable constitutes a limit to the application of said polycarbonates in such uses as in the sector of sealants, and in the sector of paints.

Copolymer diol polycarbonates, fluid at room temperature, can be obtained by starting from an organic carbonate and a mixture of two or more aliphatic diols, such as, e.g., hexanediol-1,6 and butanediol-1,4; hexanediol-1,6 and neopentyl glycol; hexanediol-1,6 and pentanediol-1,5: as disclosed in U.S. Pat. No. 4,553,729. The best elastomeric characteristics are obtained when longer-alkylene-chain diols are used, and in this case products can be obtained, which show low values of $T_g$ (glass transition temperature).

In the art, also copolyester-diol polycarbonates are known, which are obtained by starting from an organic carbonate, a lactone, in particular caprolactone, and an aliphatic diol, in particular hexanediol-1,6 (Japan 61/115,925; CA 106:85579). These products show a satisfactory whole of rheologic characteristics, of fluidity and of $T_g$, as well as of hydrolysis resistance, which is nearly the same as of pure polycarbonates.

The homopolymer diol polycarbonates known from the prior art are not useful in the sector of sealants and in the sector of paints, in which characteristics of fluidity at room temperature and a low $T_g$ value are required. Furthermore, the copolymer diol polycarbonates known from the prior art, even those, which are endowed with good fluidity at room temperature, and with good $T_g$ values, show not completely satisfactory rheologic characteristics, and their relatively high values of viscosity do not make it possible them to be satisfactorily processed in polyurethane and sealant production processes. Finally, the copolyester-diol polycarbonates obtained from lactones show the undesired characteristic of undergoing crystallization during storage at room temperatures, or at temperatures close to room temperature.

The purpose of the present invention is of overcoming the drawbacks which affect the prior art, which have been briefly mentioned above, by means of a particular class of copolyester-diol polycarbonates endowed with a desired whole of characteristics, which renders them particularly useful in the sector of polyurethanes and in the sector of sealants and adhesives, i.e., in particular, fluidity at room temperature and excellent rheologic characteristics and characteristics of hydrolysis resistance; and in the sector of paints, in particular non-crystallizing ability.

In accordance therewith, the present invention relates to copolyester-diol polycarbonates, fluid at room temperature, having a number average molecular weight comprised within the range of from 1,500 to 6,000 with a glass transition temperature ($T_g$) lower than $-45°$ C., obtained by means of a reaction of transesterification by starting from:

(a) and organic carbonate,
(b) an aliphatic diol of formula $$HO-(CH_2)_x-OH.$$

wherein x is an integer comprised within the range of from 4 to 12, (c) an oligopolyester-diol which can be represented by means of the formula:

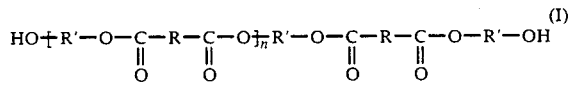

wherein:
n is an integer comprised within the range of from 0.01 to 1,
R are $-(CH_2)_y-$ radicals, derived from an aliphatic bicarboxy acid, wherein y is an integer comprised within the range of from 2 to 10,
R' are: a portion of them, radicals:

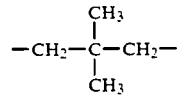

derived from neopentyl-glycol; and partially are $$-(CH_2)_z-$$

radicals, derived from at least one aliphatic diol, wherein z is an integer comprised within the range of from 4 to 12;

with the amount of (c) being furthermore comprised within the range of from 30 to 60% by weight, relatively to the total of (b)+(c); and the molar ratio of [(b)+(c)]/(a) being comprised within the range of from 1.03 to 1 3.

In the preferred form of practical embodiment, the copolyester-diol polycarbonate according to the present invention has a number average molecular weight comprised within the range of from 1,500 to 3,000, the value of n in above formula (I) is comprised within the range of from 0.01 to 0.5, the ratio of the radicals deriving from neopentyl glycol to the radicals deriving from the aliphatic diol $-(CH_2)_z-$, in (c) component, is comprised within the range of from 0.25 to 2.5, and the amount of said (c) component is comprised within the range of from 30 to 40% by weight, relatively to the total weight of (b)+(c). The (a) component can be a dialkyl carbonate (e.g., dimethyl carbonate); a dialkylene carbonate (e.g., diallyl carbonate); a cycloalkylene carbonate (e.g., ethylene or propylene carbonate); or a diaryl carbonate (e.g., diphenyl carbonate). Diallyl carbonate and diphenyl carbonate are preferably used.

The (b) component is an aliphatic diol $$HO-(CH_2)_x-OH$$

containing from 4 to 12 carbon atoms per molecule, and preferably is hexanediol-1,6.

The (c) component is an oligopolyester-diol, which is obtained by means of the reaction of an aliphatic bicarboxy acid $$HOOC-(CH_2)_y-COOH$$

containing from 4 to 12 carbon atoms in its molecule, neopentyl glycol and at least one aliphatic diol $$HO-(CH_2)_z-OH$$

containing from 4 to 12 carbon atoms in its molecule. Said aliphatic bicarboxy acid can be selected from among succinic acid, adipic acid, sebacic acid and dodecanoic acid. Among all of the above, sebacic acid is preferred. The aliphatic diol, different from neopentyl glycol, is preferably selected from among hexanediol-1,6, octanediol-1,8, and decanediol-1,10. The reaction of formation of the oligopolyester-diol is normally carried out in the presence of a catalyst, such as, e.g., an organometallic compound of tin or lead, at a preferably increasing temperature of from about 100 up to about 250° C., with water developing as the reaction byproduct being continuously removed.

In order to favour such a removal, the reaction is advantageously carried out under a reduced pressure, for example under 50 -200 torr, at least during the end portion of the reaction. In this reaction, the process is carried out by operating with a molar ratio of the diols to the bicarboxy acid comprised within the range of from 1.25 to 2. The reaction is continued over a time comprised within the range of from about 4 to about 10 hours, until the number of acidity is decreased down to values lower than 3 mg of KOH/g, and an oligopolyester-diol of formula (I) is obtained, with 0 being comprised within the range of from 0.01 to 1, and preferably of from 0.01 to 0.05. The preferred values of molecular weight for the oligopolyester-diol are comprised within the range of from 300 to 800.

The copolyester-diol polycarbonates according to the present invention are obtained by reacting, under transesterification conditions, the (a), (b) and (c) components, in the above stated proportions. When the (a) component is a dialkyl carbonate or a dialkylene carbonate, a transesterification catalyst, preferably an alkaline type of catalyst, such as an alkali-metal alkoxide, such as sodium methoxide, should be used. The reaction is carried out under a preferably increasing temperature of from about 80° C. up to about 200° C., with the alcohol, the glycol, the phenol which are formed as reaction byproducts being continuously removed. In order to favour such a removal, the reaction is suitably carried out under a reduced pressure, of, e.g., 50-200 torr, at least during the end portion of the reaction. The reaction times are generally comprised within the range of from 4 to 10 hours.

By operating under these conditions, the copolyester-diol polycarbonates according to the present invention are obtained with a number average molecular weight comprised within the range cf from 1,500 to 6,000 and preferably of from 1,500 to 3,000, with a $T_g$ value lower than $-45°$ C., with a hydroxy functionality generally higher than 97% of theoretical value, and with a number of residual acidity lower than 3 and preferably lower than 1 mg of KOH/g. These products are fluids endowed with flowing ability at room temperature, without, or substantially without any trend to crystallize under room conditions, and endowed with excellent characteristics of ageing resistance, light resistance and moisture resistance. In view of such characteristics, the copolyester-diol polycarbonates according to the present invention find use in polyurethane chemistry, and in the sector of sealants and adhesives, in which a very high stability to hydrolysis, to light and to moisture is required; and in the sector of paints, in which the absence of any trend to crystallize is required.

The following experimental examples are reported in order to illustrate the invention in greater detail.

EXAMPLES 1-5

Neopentyl glycol, an aliphatic diol and an aliphatic bicarboxy acid, in the molar ratio of 1:1:1, are charged to a flask equipped with a mechanical blade stirrer, nitrogen way, thermometer and Marcuvson head.

Dibutyl-tin oxide is added in order to act as the catalyst, in an amount of 0.01% by weight, relatively to the weight of the mixture. The flask is dipped in an oil bath heated at 100° C., and its contents are kept stirred while the temperature is increased up to 210° C. within a 2-hours time. The reaction mixture is kept stirred at such a temperature for 3 hours, with water being removed as it is formed, by means of the Marcuvson head. The removal of water is completed by opeating at an inner temperature of 190° C., and under a pressure of 250 torr. At the end, the reaction mixture is cooled and the oligopolyester diol is recovered, the characteristics of which are reported in Table 1, together with other details about the reaction.

In this Table, the following abbreviations are used:
- ■ NPG = neopentyl glycol;
- ■ ND = hexanediol-1,6;
- ■ DD = decanediol-1,10;
- ■ SA = succinic acid;
- ■ AA = adipic acid;
- ■ SEBA = sebacic acid;
- ■ DDD = dodecanoic acid.

TABLE 1

| Example No. | 1 | 2 | 3 | 4 | 5 |
|---|---|---|---|---|---|
| NPG (mol) | 3.84 | 3.20 | 2.80 | 1.00 | 1.00 |
| HD (mol) | 3.84 | 3.20 | 2.80 | 1.00 | — |
| DD (mol) | — | — | — | — | 1.00 |
| Bicarboxy acid: | | | | | |
| ■ type | SA | AA | SEBA | DDD | SEBA |
| ■ mol | 3.84 | 3.20 | 2.80 | 1.00 | 1.00 |
| Yield (g) | 1159 | 1045 | 1081 | 410 | — |
| Appearance (20° C.) | liquid | liquid | semisolid | semisolid | semisolid |
| OH (% by weight) | 10.50 | 8.82 | 7.82 | 7.56 | 7.0 |
| No. of acidity (mg of KOH/g) | 1.3 | 2.5 | 1.8 | 2.0 | 3.0 |

TABLE 1-continued

| Example No. | 1 | 2 | 3 | 4 | 5 |
|---|---|---|---|---|---|
| Mn | 326.6 | 385.7 | 435 | 448 | 485 |

For comparison purposes, a typical polycaprolactone polycarbonate of the prior art is crystalline, shows a content of hydroxy groups (OH) of 6.41% by weight, a number of acidity lower than 3 mg of KOH/g, an a number average molecular weight (Mn) of 530.

EXAMPLES 6-11

An aliphatic diol, an oligopolyester-diol, selected from among those obtained from the preceding examples, and diallyl-carbonate (DAC) are charged under a nitrogen blanketing atmosphere to a flask equipped with a rectification tower and a distillation head. As the catalyst, sodium methoxide as a solution at 30% by weight in methanol is used. The reaction of transesterification is carried out at a temperature comprised within the range of from 90° to 175° C., under a pressure of 100 torr. Under these conditions, allyl alcohol with a purity higher than 99.5% by weight can be drawn from the head of the rectification tower at a temperature of 50° C.

The reaction is continued under such conditions for a time of from 3 to 4 hours, and the reaction is completed at 175° C. and under 5 torr during a further time period of 1-2 hours. The reaction mixture is finally cooled and the copolyster-diol polycarbonate is recovered. The details of reaction conditions and the reaction yields are reported in Table 2.

In particular, in this Table, the term "Polyester (% by weight)" means the percentage of polyester contained in the copolyester-diol polycarbonate obtained.

In Table 3, the characteristics are reported of the copolyester-diol polycarbonates obtained. One can observe that these latter are fluid at room temperature, and that the best rheologic characteristics are shown by the copolyester-diol polycarbonates which contain sebacic acid.

TABLE 2

| Example No. | 6 | 7 | 8 | 9 | 10 | 11 |
|---|---|---|---|---|---|---|
| Oligopolyester of Example | 1 | 1 | 2 | 3 | 4 | 5 |
| Oligopolyester, mol | 0.443 | 0.714 | 0.6 | 0.6 | 0.74 | 0.52 |
| Diol | HD | HD | HD | HD | HD | HD |
| Diol, mol | 1.858 | 1.786 | 1.5 | 1.5 | 2.35 | 1.78 |
| DAC (mol) | 2.36 | 2.27 | 1.91 | 1.0 | 2.75 | 2.04 |
| DAC/diol molar ratio | 1.102 | 1.102 | 1.099 | 1.099 | 1.12 | 1.125 |
| Yield (g) | 506.0 | 486.8 | 424 | 475 | 654 | 498 |
| Recovered allyl alcohol (mol) | 4.75 | 4.51 | 3.80 | 1.99 | 4.7 | 3.52 |
| Polyester (% by weight) | 47.4 | 47.5 | 49.5 | 54.9 | 50.5 | 50.2 |

TABLE 3

| Example No. | 6 | 7 | 8 | 9 | 10 | 11 |
|---|---|---|---|---|---|---|
| OH (% by weight) | 1.47 | 1.20 | 0.96 | 1.13 | 1.56 | 1.52 |
| Mn | 2313 | 2830 | 3540 | 3000 | 2180 | 2240 |
| Unsaturations (meq/g) | 0.022 | <0.01 | 0.02 | 0.01 | 0.01 | 0.012 |
| Appearance (30° C.) | liquid | liquid | liquid | liquid | liquid | liquid |
| $T_g$ (°C.) | −47.6 | −49 | −52.9 | −55.7 | −51 | −57.3 |
| Viscosity, Pa · s | | | | | | |
| at 25° C. | 108 | 190 | 281 | 79.5 | — | 67 |
| at 50° C. | 20.2 | 20 | 61.6 | 12.3 | 4.8 | 5.8 |
| at 75° C. | 6.2 | 6.2 | 15.0 | 3.6 | 1.4 | 1.6 |

EXAMPLE 12 (COMPARATIVE EXAMPLE)

For comparative purposes, a polycaprolactone polycarbonate is prepared from hexanediol-1,6 and caprolactone, with caprolactone (342.45 g, 3.0 mol), hexanediol-1,6 (709.1 g, 6 mol), diallyl carbonate (797.0 g, 5.61 mol) and 1.9 g of sodium methoxide (in solution at 30% by weight in methanol) being charged to the reactor. The transesterification is carried out according to the modalities as disclosed in Examples from 6 to 11. From the reaction 655 g (9.48 mol) of allyl alcohol is developed, and 1170 g of polycaprolactone-diol polycarbonate is obtained, with the following characteristics:

| | |
|---|---|
| ■ OH (% by weight) | 110 |
| ■ Mn | 3090 |
| ■ $T_m$ (°C.) | 13 |
| ■ $T_g$ (°C.) | −59 |
| ■ Unsaturations (meq/g) | 0.02 |
| ■ Viscosity, Pa · s, at | |
| 25° C. | 106.5 |
| 50° C. | 25.5 |
| 75° C. | 7.9 |

By comparing these to the data of Table 3, one can observe that the copolyester-diol polycarbonates according to the present invention, with their molecular weight being the same, show viscosity values which are nearly halved as compared to the polycaprolactone-diol polycarbonate.

I claim:

1. Copolyester diol polycarbonates, fluid at room temperature, having a molecular weight comprised within the range of from 1,500 to 6,000 with a glass transition temperature ($T_g$) lower than −45° C., obtained by means of a reaction of transesterification by starting from:

(a) and organic carbonate,
    (b) an aliphatic diol of formula $$HO-(CH_2)_x-OH,$$

wherein x is an integer comprised within the range of from 4 to 12, (c) an oligopolyester-diol which can be represented by means of the formula:

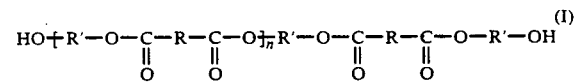

wherein:

n is an integer comprised within the range of from 0.001 to 1,

R are $-(CH_2)_y-$ radicals, derived from an unsaturated aliphatic bicarboxy acid, wherein y is an integer comprised within the range of from 2 to 10, R' are: a portion of them, radicals:

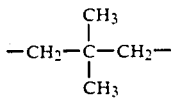

derived from neopentyl-glycol; and partially are

radicals, derived from an aliphatic diol, wherein z is an integer comprised within the range of from 4 to 12;

with the amount of (c) being furthermore comprised within the range of from 30 to 60% by weight, relatively to the total weight of (b)+(c); and the molar ratio of [(b)+(c)]/(a) being comprised within the range of from 1.03 to 1.3.

2. Copolyester-diol polycarbonates according to claim 1, characterized in that their number average molecular weight is comprised within the range of from 1,500 to 3,000, the value of n in above formula (I) is comprised within the range of from 0.01 to 0.5, the ratio of the radicals deriving from neopentyl glycol to the radicals deriving from the aliphatic diol —(CH$_2$)$_z$—, in (c) component, is comprised within the range of from 0.25 to 2.5, and the amount of said (c) component is comprised within the range of from 30 to 40% by weight, relatively to the total weight of (b)+(c).

3. Copolyester-diol polycarbonates according to claim 1, characterized in that the (a) component is selected from the group consiting of dialkyl carbonates, dialkylene carbonates, cycloalkylene carbonates and diaryl carbonates.

4. Copolyester-diol polycarbonates according to claim 3, characterized in that said organic carbonate is diallyl carbonate or diphenyl carbonate.

5. Copolyester-diol polycarbonates according to claim 1, characterized in that the (b) component is hexanediol-1,6.

6. Copolyester-diol polycarbonates according to claim 1, characterized in that the (c) component is a product of reaction of an aliphatic bicarboxy acid

wherein y is an integer comprised within the range of from 2 to 10, neopentyl glycol and at least one aliphatic diol

wherein z is an integer comprised within the range of from 4 to 12, with a molar ratio of the diols to the bicarboxy acid comprised within the range of from 1.25 to 2, by operating in the presence of a catalyst constituted by an organometallic compound of tin or of lead, at an increasing temperature of from about 100° up to about 250° C., with water reaction byproduct being removed.

7. Copolyester-diol polycarbonates according to claim 6, characterized in that said aliphatic bicarboxy acid is selected from among succinic acid, adipic acid, sebacic acid and dodecanoic acid, and preferably is sebacic acid, and the aliphatic diol is selected from among hexanediol-1,6, octanediol-1,8, and decanediol-1,10.

8. Copolyester-diol polycarbonates according to claim 1, characterized in that the reaction of transesterification is carried out in the presence of a transesterification catalyst, at an increasing temperature of from about 80° up to about 200° C., with the alcohol, the glycol or the phenol reaction byproduct being removed.

9. A method of reducing the tendency of a paint composition comprising copolyester-diol polycarbonate from undergoing crystallization during storage at or about room temperature, said method comprising using as the copolyester-diol polycarbonate one or more copolyester-diol polycarbonates having a molecular weight comprised within the range of from 1,500 to 6,000 with a glass transition temperature (Tg) lower than −45° C., obtained by means of a reaction of transesterification by starting from:

(a) an organic carbonate, (b) an aliphatic diol of formula

wherein x is an integer comprised within the range of from 4 to 12, (c) an oligopolyester-diol which can be represented by means of the formula:

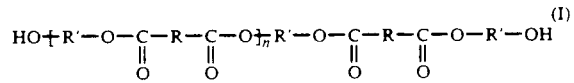

wherein:

n is an integer comprised within the range of from 0.001 to 1,

R are —(CH$_2$)$_y$— radicals, derived from an unsaturated aliphatic bicarboxy acid, wherein y is an integer comprised within the range of from 2 to 10, R' are: a portion of them, radicals:

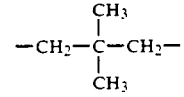

derived from neopentyl-glycol; and partially are

radicals, derived from an aliphatic diol, wherein z is an integer comprised within the range of from 4 to 12;

with the amount of (c) being furthermore comprised within the range of from 30 to 60% by weight, relatively to the total weight of (b)+(c); and the molar ratio of [(b)+(c)]/(a) being comprised within the range of from 1.03 to 1.3.

10. A method of improving the fluidity at room temperature and resistance to hydrolysis of a polyurethane composition containing copolyester-diol polycarbonate, said method comprising using as the copolyester-diol polycarbonate one or more copolyester-diol polycarbonates having a molecular weight comprised within the range of from 1,500 to 6,000 with a glass transition temperature (Tg) lower than −45° C., obtained by means of a reaction of transesterification by starting from:

(a) an organic carbonate, (b) an aliphatic diol of formula $$HO-(CH_2)_x-OH.$$

wherein x is an integer comprised within the range of from 4 to 12, (c) an oligopolyester-diol which can be represented by means of the formula:

$$HO+R'-O-\underset{\underset{O}{\|}}{C}-R-\underset{\underset{O}{\|}}{C}-O\xrightarrow{}_nR'-O-\underset{\underset{O}{\|}}{C}-R-\underset{\underset{O}{\|}}{C}-O-R'-OH \quad (I)$$

wherein:

n is an integer comprised within the range of from 0.001 to 1,

R are $-(CH_2)_y-$ radicals, derived from an unsaturated aliphatic bicarboxy acid, wherein y is an integer comprised within the range of from 2 to 10, R' are: a portion of them, radicals:

$$-CH_2-\underset{\underset{CH_3}{|}}{\overset{\overset{CH_3}{|}}{C}}-CH_2-$$

derived from neopentyl-glycol; and partially are $$-(CH_2)_z-$$

radicals, derived from an aliphatic diol, wherein z is an integer comprised within the range of from 4 to 12;

with the amount of (c) being furthermore comprised within the range of from 30 to 60% by weight, relatively to the total weight of (b)+(c); and the molar ratio of [(b)+(c)]/(a) being comprised within the range of from 1.03 to 1.3.

11. A method of improving the fluidity at room temperature and resistance to hydrolysis of (i) a sealant composition containing copolyester-diol polycarbonate or (ii) adhesive composition containing copolyester-diol polycarbonate, said method comprising using as the copolyester-diol polycarbonate one or more copolyester-diol polycarbonates having a molecular weight comprised within the range of from 1,500 to 6,000 with a glass transition temperature (Tg) lower than −45° C., obtained by means of a reaction of transesterification by starting from:

(a) an organic carbonate, (b) an aliphatic diol of formula $$HO-(CH_2)_x-OH.$$

wherein x is an integer comprised within the range of from 4 to 12, (c) an oligopolyester-diol which can be represented by means of the formula:

$$HO+R'-O-\underset{\underset{O}{\|}}{C}-R-\underset{\underset{O}{\|}}{C}-O\xrightarrow{}_nR'-O-\underset{\underset{O}{\|}}{C}-R-\underset{\underset{O}{\|}}{C}-O-R'-OH \quad (I)$$

wherein:

n is an integer comprised within the range of from 0.001 to 1,

R are $-(CH_2)_y-$ radicals, derived from an unsaturated aliphatic bicarboxy acid, wherein y is an integer comprised within the range of from 2 to 10, R' are: a portion of them, radicals:

$$-CH_2-\underset{\underset{CH_3}{|}}{\overset{\overset{CH_3}{|}}{C}}-CH_2-$$

derived from neopentyl-glycol; and partially are $$-(CH_2)_z-$$

radicals, derived from an aliphatic diol, wherein z is an integer comprised within the range of from 4 to 12; with the amount of (c) being furthermore comprised within the range of from 30 to 60% by weight, relatively to the total weight of (b)+(c); and the molar ratio of [(b)+(c)]/(a) being comprised within the range of from 1.03 to 1.3.

* * * * *